(12) United States Patent
Miura et al.

(10) Patent No.: US 7,917,342 B2
(45) Date of Patent: Mar. 29, 2011

(54) COMPUTER AIDED DESIGN SYSTEM AND COMPUTER AIDED DESIGN PROGRAM USING A GEOMETRIC SURFACE MODEL

(75) Inventors: Masami Miura, Nagasaki (JP); Takayuki Kawano, Nagasaki (JP); Yuichi Sasaki, Nagasaki (JP); Takeshi Nakahama, Nagasaki (JP); Yasuhiko Yoshida, Anjo (JP)

(73) Assignees: Mitsubishi Heavy Industries, Ltd., Tokyo (JP); PAL Corporation Ltd., Nagasaki-Ken (JP)

( * ) Notice: Subject to any disclaimer, the term of this patent is extended or adjusted under 35 U.S.C. 154(b) by 855 days.

(21) Appl. No.: 10/529,645

(22) PCT Filed: Oct. 6, 2003

(86) PCT No.: PCT/JP03/12748
§ 371 (c)(1),
(2), (4) Date: Dec. 5, 2005

(87) PCT Pub. No.: WO2004/031998
PCT Pub. Date: Apr. 15, 2004

(65) Prior Publication Data
US 2006/0129361 A1 Jun. 15, 2006

(30) Foreign Application Priority Data
Oct. 4, 2002 (JP) .................. 2002-292585

(51) Int. Cl.
*G06F 17/50* (2006.01)
*G06F 7/60* (2006.01)
*G06T 15/00* (2006.01)
*G06T 11/20* (2006.01)

(52) U.S. Cl. ................. 703/2; 703/1; 345/419; 345/442
(58) Field of Classification Search .................. 703/1, 2; 345/419, 442
See application file for complete search history.

(56) References Cited

U.S. PATENT DOCUMENTS
5,497,451 A * 3/1996 Holmes .................. 345/420
(Continued)

FOREIGN PATENT DOCUMENTS
EP 0 898 247 2/1999
(Continued)

OTHER PUBLICATIONS

Government of India the Patent Office Official Action issued Aug. 21, 2007 in Indian Application No. 00514/KOLNP/2005.
(Continued)

*Primary Examiner* — Jason Proctor
*Assistant Examiner* — Nithya Janakiraman
(74) *Attorney, Agent, or Firm* — Wenderoth, Lind & Ponack, L.L.P.

(57) ABSTRACT

A computer aided design system and a computer aided design program which can greatly increase the utility of a computer aided design model, and can improve the efficiency of design and production processes, by adopting a curved surface theory which ensures the continuity of a free-form line or surface. A computer executes: a point sequence information extraction process for extracting a plurality of point sequences on a curved surface; a dividing process for generating a curved surface from the point sequences and dividing the curved surface into a predetermined number of mesh points; a first fundamental form computing process for computing coefficients of the first fundamental form; a second fundamental form computing process for computing coefficients of the second fundamental form; and a storage process for storing the point sequence information, the coefficients of the first fundamental form and the coefficients of the second fundamental form.

15 Claims, 10 Drawing Sheets

CURVATURE = SAME AS DIFFERENTIAL OF NORMAL SECTION PLANE

U.S. PATENT DOCUMENTS

| | | | |
|---|---|---|---|
| 5,636,338 A * | 6/1997 | Moreton | 345/442 |
| 5,936,628 A | 8/1999 | Kitamura et al. | |
| 5,991,703 A | 11/1999 | Kase | |
| 6,201,549 B1 * | 3/2001 | Bronskill | 345/441 |
| 6,236,403 B1 * | 5/2001 | Chaki et al. | 345/420 |
| 6,256,038 B1 * | 7/2001 | Krishnamurthy | 345/419 |
| 6,711,530 B1 * | 3/2004 | Kase | 703/2 |

FOREIGN PATENT DOCUMENTS

| | | | |
|---|---|---|---|
| JP | 62135965 A * | 6/1987 | |
| JP | 64-65628 | 3/1989 | |
| JP | 4-117572 | 4/1992 | |
| JP | 4-134571 | 5/1992 | |
| JP | 07-085314 | 3/1995 | |
| JP | 9-101136 | 4/1997 | |
| JP | 10-69506 | 3/1998 | |
| JP | 11-65628 | 3/1999 | |
| JP | 11-195139 | 7/1999 | |
| JP | 2000-259835 | 9/2000 | |
| JP | 2001-250130 | 9/2001 | |

OTHER PUBLICATIONS

Supplementary European Search Report issued Nov. 18, 2008 in connection with EP 03 74 8703 corresponding to the present U.S. application.

Moreton, H. et al., Functional Optimization for Fair Surface Design, *Computer Graphics*, vol. 26, No. 2 (Jul. 1992), pp. 167-176.

* cited by examiner

FIG. 6

DEVELOPABLE SURFACES

| | Kg > 0 | Kg = 0 | Kg < 0 |
|---|---|---|---|
| Km > 0 | CONCAVITY TYPE | VALLEY TYPE | SADDLE TYPE (VALLEY) |
| Km = 0 | (NONE) | PLANE | SADDLE TYPE (EVEN) |
| Km < 0 | CONVEX TYPE | RIDGE TYPE | SADDLE TYPE (RIDGE) |

CLASSIFICATION BY MEAN CURVATURE AND GAUSSIAN CURVATURE

ISOCLINIC
ORTHOGONAL LINES

☆ UMBILICUS POINTS (BALL POINTS)

PRINCIPAL CURVATURE EXTREMUM LINES

☆ UMBILICUS POINTS (BALL POINTS)

LINES OF CURVATURE

COMPUTER AIDED DESIGN SYSTEM AND COMPUTER AIDED DESIGN PROGRAM USING A GEOMETRIC SURFACE MODEL

BACKGROUND OF THE INVENTION

1. Technical Field

The present invention relates to a computer aided design system and a computer aided design program which transform the shape of a member into an objective curved surface shape.

2. Background Art

Today, there is a desire to shorten processes from planning to design and production to respond to consumer demand. In order to improve the efficiency of design and production processes, the use of CG (Computer Graphics) and CAD (Computer Aided Design) systems is popular. In order to depict shapes having complex curved lines or curved surface shapes, such as for motor vehicles, domestic electric appliances, or the like, on a computer, the following processing methods have conventionally been used.

The first method is solid modeling, where simple shapes called primitives are held in a computer, and operations to combine the shapes with each other are repeated in order to express complex shapes. A primitive is for example a column, a cube, a hexahedron, a torus, a ball, or the like, and in solid modeling shapes are represented by set operations on these primitives. Therefore, in order to produce a complex shape many steps are required and precise calculations are required.

The second method is surface modeling, which utilizes an algorithm such as a bezier, b-spline, rational bezier, NURBS (Non-Uniform Rational b-spline), or the like in order to perform operations such as cutting or connecting lines or surfaces, and by repeating these operations complex free curved lines or curved surfaces are represented.

However, even with a model in which there are no problems in the representation with the solid model or surface model described above, in some cases problems may occur when the model is used by a downstream application such as CAM, CAE, or the like. This is caused by differences between the support element to be supported by the produced computer graphics, and the support element to be supported by the other computer graphics, computer aided design, and downstream applications, and differences in shape definition, or the like. The model is corrected via an application such as a translator which modifies these differences (Japanese Unexamined Patent Publication Nos. 2001-250130, Hei 11-65628, Hei 10-69506, Hei 4-134571, Hei 4-117572, and Hei 1-65628).

BRIEF SUMMARY OF THE INVENTION

However, the above described correcting operations greatly prolong the design and production processes. The reasons for requiring the corrections vary depending on each case, but the point which becomes a problem, particularly in the production stage is that the representations of all curved lines and curved surfaces are approximated by Euclidean geometry in a conventional computer graphics or computer aided design system. For example, in the case where a saddle-type surface of the tabulated surfaces shown in FIG. 6 is generated by a sweep operation, there exists a long line in the lower slope part of the saddle and a short line in the central part of the saddle. Therefore, this sweep operation is a transformation accompanied with graphical expansion and contraction in order to maintain the continuity of the curved surface generated. However, in a conventional computer graphics or computer aided design system, this expansion and contraction is not considered, and the internal representation is approximately represented as a cylinder type. Therefore, if the computer graphics model or computer aided design model which are approximately represented by such Euclidean geometry, are passed to a CAE, the error occurring in the model becomes a problem in production.

The present invention has been devised to solve such problems, with an object of providing a computer aided design system and a computer aided design program which can efficiently utilize a computer graphics model or a computer aided design model, and can improve the efficiency of design and production processes.

A computer aided design system of the present invention comprises: a point sequence information extraction device which extracts a plurality of point sequences on a curved surface; a dividing device which generates a curved surface from the point sequences using another computer aided design system, and divides the curved surface into a predetermined number of meshes; a first fundamental form computing device for computing coefficients of the first fundamental form defined by a tangent vector which forms a tangent plane of the mesh; a second fundamental form computing device for computing coefficients of the second fundamental form defined by the tangent vector and a normal vector of the mesh; and a memory device which stores the point sequence information, the coefficients of the first fundamental form and the coefficients of the second fundamental form.

Furthermore, the computer aided design system of the present invention further comprises: a principal curvature computing device which computes a principal curvature of the mesh based on the coefficients of the first fundamental form and the coefficients of the second fundamental form; a line of curvature computing device which computes a line of curvature showing a principal direction of the mesh based on the principal curvature; a feature point/feature line analyzing device which extracts a point or a line which become a reference point or a reference line of transformation defined by changing patterns of one or more feature quantities among five feature quantities showing features of the curved surface comprising a Gaussian curvature and a mean curvature computed based on the principal curvature, the principal direction, the line of curvature, and the coefficients of the first fundamental form and coefficients of the second fundamental form; and a girth length computing device which computes a girth length based on a curvature computed from the coefficients of the first fundamental form and the coefficients of the second fundamental form.

Moreover, the computer aided design system of the present invention further comprises: a reproducing device which transforms the line of curvature for the girth length in the line of curvature direction, with the feature point or feature line as a transformation reference, and reproduces the mesh or the curved surface.

Furthermore, the computer aided design system of the present invention further comprises: a converting device which extracts a plurality of point sequences on a curved surface from the reproduced mesh or curved surface, and converts the point sequences according to a graphical representation algorithm in another computer aided design system.

A computer aided design program of the present invention executes on a computer: a point sequence information extraction process for extracting a plurality of point sequences on a curved surface; a dividing process for generating a curved surface from the point sequences using another computer aided design system, and dividing the curved surface into a predetermined number of meshes; a first fundamental form computing process for computing coefficients of the first fundamental form defined by a tangent vector which forms a tangent plane of the mesh; a second fundamental form computing process for computing coefficients of the second fundamental form defined by the tangent vector and a normal vector of the mesh; and a storage process for storing the point sequence information, the coefficients of the first fundamental form and the coefficients of the second fundamental form.

Moreover, the computer aided design program of the present invention is a computer aided design program for further executing on a computer: a principal curvature computing process for computing a principal curvature of the mesh based on the coefficients of the first fundamental form and the coefficients of the second fundamental form; a line of curvature computing process for computing a line of curvature showing a principal direction of the mesh based on the principal curvature; a feature point/feature line analyzing process for extracting a point or a line which become a reference point or a reference line of transformation defined by changing patterns of one or more feature quantities among five feature quantities showing features of the curved surface comprising a Gaussian curvature and a mean curvature computed based on the principal curvature, the principal direction, the line of curvature, and the coefficients of the first fundamental form and the coefficients of the second fundamental form; and a girth length computing process for computing a girth length based on a curvature computed from the coefficients of the first fundamental form and coefficients of the second fundamental form.

Furthermore, the computer aided design program of the present invention is a computer aided design program for further executing on a computer: a reproducing process for transforming the line of curvature for the girth length in the line of curvature direction, with the feature point or feature line as a transformation reference, and reproducing the mesh or the curved surface.

Moreover, the computer aided design program of the present invention is a computer aided design program for further executing on a computer: a converting process for extracting a plurality of point sequences on a curved surface from the reproduced mesh or curved surface, and converting the point sequences according to a graphical representation algorithm in another computer aided design system.

A computer graphics system of the present invention comprises: a point sequence information extraction device which extracts a plurality of point sequences on a curved surface; a dividing device which generates a curved surface from the point sequences using another computer graphics system, and divides the curved surface into a predetermined number of meshes; a first fundamental form computing device for computing coefficients of the first fundamental form defined by a tangent vector which forms a tangent plane of the mesh; a second fundamental form computing device for computing coefficients of the second fundamental form defined by the tangent vector and a normal vector of the mesh; and a memory device which stores the point sequence information, the coefficients of the first fundamental form and the coefficients of the second fundamental form.

Moreover, the computer graphics program of the present invention is a computer graphics program for executing on a computer: a point sequence information extraction process for extracting a plurality of point sequences on a curved surface; a dividing process for generating a curved surface from the point sequences using another computer graphics system, and dividing the curved surface into a predetermined number of meshes; a first fundamental form computing process for computing coefficients of the first fundamental form defined by a tangent vector which forms a tangent plane of the mesh; a second fundamental form computing process for computing coefficients of the second fundamental form defined by the tangent vector and a normal vector of the mesh; and a storage process for storing the point sequence information, the coefficients of the first fundamental form and the coefficients of the second fundamental form.

The present invention demonstrates the following effects.

Since it comprises: the point sequence information extraction device which extracts a plurality of point sequences on a curved surface; the dividing device which generates a curved surface from the point sequences using another computer graphics system or computer aided design system, and divides the curved surface into a predetermined number of meshes; the first fundamental form computing device for computing coefficients of the first fundamental form defined by a tangent vector which forms a tangent plane of the mesh; the second fundamental form computing device for computing coefficients of the second fundamental form defined by the tangent vector and a normal vector of the mesh; and the memory device which stores the point sequence information, the coefficients of the first fundamental form and the coefficients of the second fundamental form, then by adopting a curved surface theory which ensures the continuity of a free-form line/free-form surface, a computer graphics model or a computer aided design model can be widely utilized, and the efficiency of design and production processes can be improved.

Moreover, since it further comprises: the principal curvature computing device which computes a principal curvature of the mesh based on the coefficients of the first fundamental form and the coefficients of the second fundamental form; the line of curvature computing device which computes a line of curvature showing a principal direction of the mesh based on the principal curvature; the feature point/feature line analyzing device which extracts a point or a line which become a reference point or a reference line of transformation defined by changing patterns of one or more feature quantities among five feature quantities showing features of the curved surface comprising a Gaussian curvature and a mean curvature computed based on the principal curvature, the principal direction, the line of curvature, and the coefficients of the first fundamental form and the coefficients of the second fundamental form; and the girth length computing device which computes a girth length based on a curvature computed from the coefficients of the first fundamental form and the coefficients of the second fundamental form, then a computer graphics or computer aided design model analyzed by the curved surface theory can be reproduced and converted into another computer graphics or computer aided design model.

Furthermore, since it further comprises: the reproducing device which transforms the line of curvature for the girth length in the line of curvature direction, with the feature point or the feature line as the transformation reference, and reproduces the mesh or the curved surface, then a computer graphics or computer aided design model analyzed by the curved surface theory can be reproduced.

Moreover, since it further comprises: the converting device which extracts a plurality of point sequences on a curved surface from the reproduced mesh or curved surface, and converts the point sequences according to a graphic expression algorithm in another computer graphics or computer aided design system, then a computer graphics or computer aided design model analyzed by the curved surface theory can be converted into another computer graphics or computer aided design model.

BRIEF DESCRIPTION OF DRAWINGS

FIG. 6 is an explanatory diagram showing classifications of mean curvature and Gaussian curvature.

DETAILED DESCRIPTION OF THE INVENTION

Figure 1:
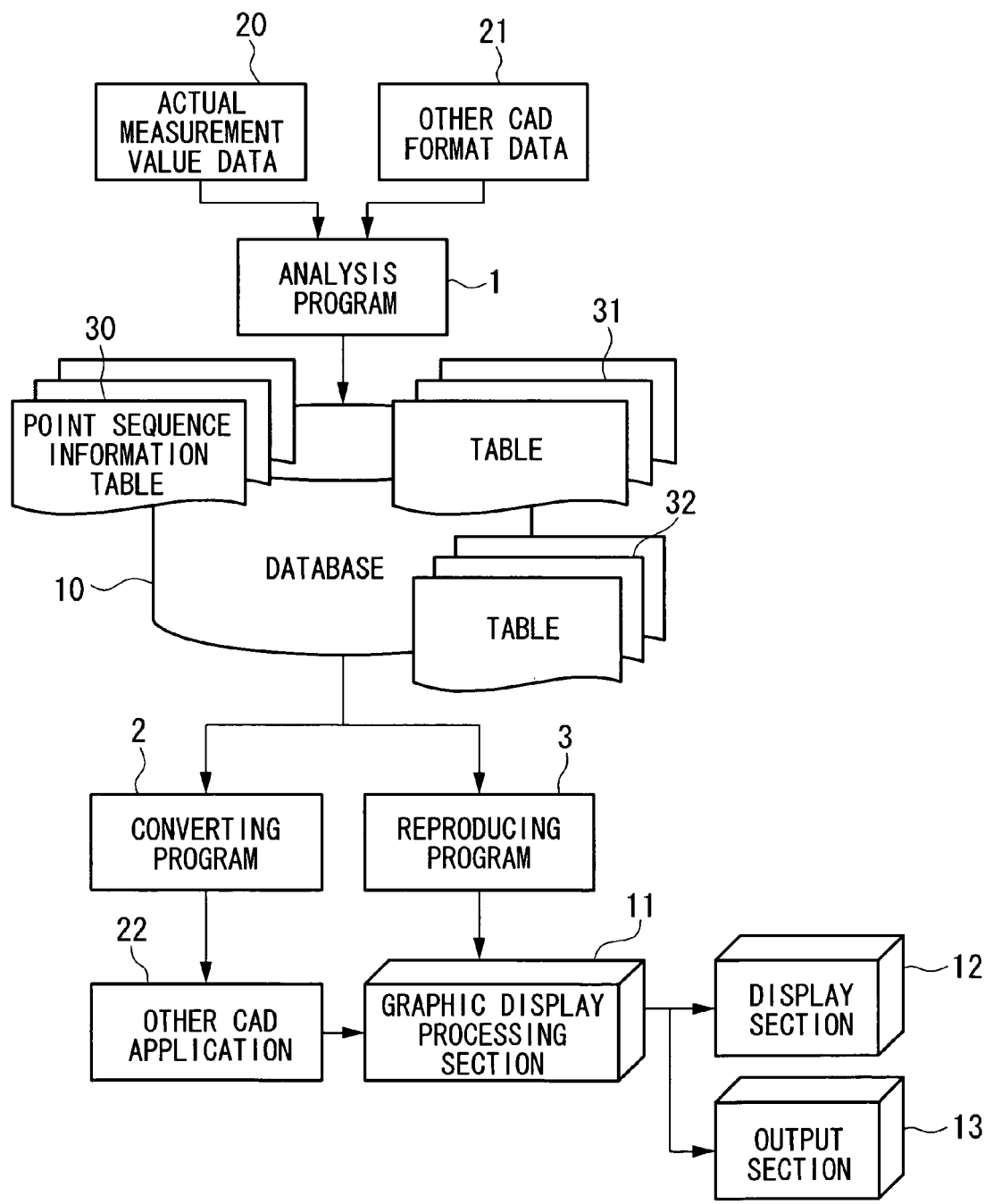
FIG. 1 is a block diagram showing a configuration of a computer aided design system of the present embodiment.

Hereunder is a description of an embodiment of a computer aided design system of the present invention, with reference to the drawings. FIG. 1 is a block diagram showing a configuration of the computer aided design system of the present embodiment. The computer aided design system of the present embodiment comprises a central processor such as central processing unit (CPU) or the like (not shown), a storage memory such as a ROM, RAM, or the like (not shown), a database 10, a graphic display processing section 11, a display section 12, an output section 13, and a communication section (not shown).

The CPU reads out an analysis program 1, a converting program 2, and a reproducing program 3 stored in a ROM and executes a series of processes related to free-form surface analysis, conversion, and reproduction. The RAM is a semiconductor memory in which the CPU primarily stores data.

The analysis program 1 is a computer program which executes a process for reading in actual measurement value data 20 of a three-dimensional shaped body by CAT (computer aided testing) or the like, or other computer aided design format data 21 (graphics data represented for example by a surface model such as a solid model, a bezier, a b-spline, a rational bezier, or a NURBS), creating a point sequence information table 30, a table 31 of coefficients of the first fundamental form, and a table 32 of coefficients of the second fundamental form, and then storing this in the database 10.

Figure 2:
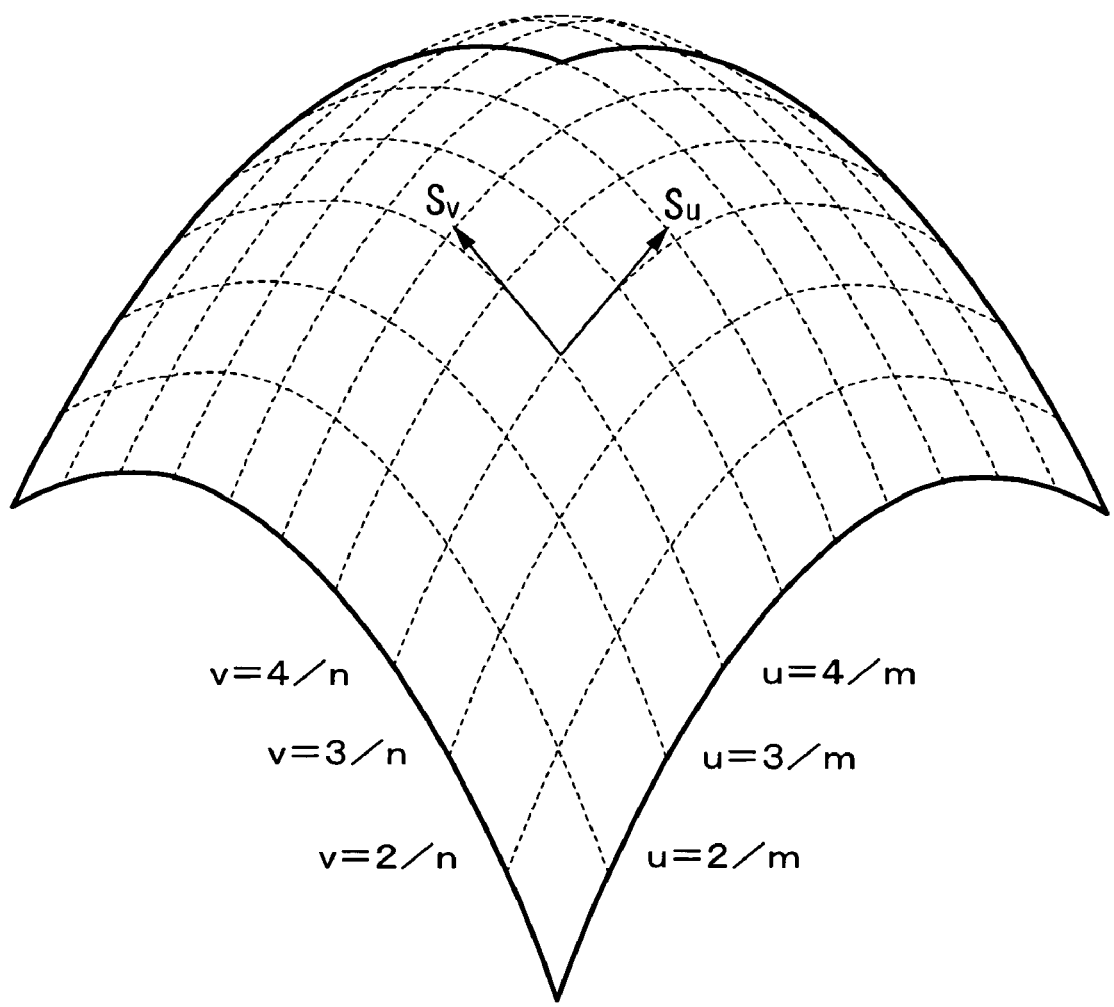
FIG. 2 is an explanatory diagram showing a situation for dividing a curved surface into an m×n mesh and defining fundamental vectors Su and Sv.

The point sequence information table 30 comprises point sequence information (u, v) for on a curved surface expressed in a parameter form of;

$$s(u,v)=\{x(u,v),y(u,v),z(u,v)\} \quad 0<u, v<1 \qquad \text{(equation 1)}$$

as shown in FIG. 2. For example, assuming that u=0, 1/m, 2/m, to m−1/m (m is a natural number) and v=0, 1/n, 2/n, to n−1/n (n is a natural number), the curved surface shown in FIG. 2 is divided into an m×n mesh. In this case, the point sequence information (u, v) becomes an mn data sequence from the mesh ID1 to IDmn.

The table 31 of coefficients of the first fundamental form comprises coefficients of the first fundamental form E, F, and G derived from the following equations. In the case where u and v described above have a functional relation, then (u, v) denotes a curved line on the curved surface, the partial derivative $\partial s/\partial u = Su$ denotes a tangent vector of a curved line of u=constant, and the partial derivative $\partial s/\partial v = Sv$ denotes a tangent vector of a curved line of v=constant. At this time, the fundamental vectors Su and Sv form a tangent plane of the curved surface. Moreover, a vector ds linking two points on the curved surface, from s (u, v) to s (u+du, v+dv), is represented by:

$$ds = s_u du + s_v dv \qquad \text{(equation 2)}$$

Here, the square of the absolute value of ds is represented by:

$$(ds)^2 = ds \cdot ds = s_u^2 (du)^2 + 2 s_u \cdot s_v du dv + s_v^2 (dv)^2 \qquad \text{(equation 3)}$$

The coefficients of the first fundamental form described above are defined from the fundamental vector of the curved surface by the following equation:

$$E = s_u^2,\ F = s_u \cdot s_v,\ G = s_v^2 \qquad \text{(equation 4)}$$

The coefficients of the first fundamental form E, F, and G described above are uniquely determined for the respective mesh points in this way. The table 31 of coefficients of the first fundamental form stores the values for the respective mesh points ID1 to IDmn.

Moreover, combining the abovementioned equation 3 and equation 4 gives:

$$ds^2 = E(du)^2 + 2F du dv + G(dv)^2 \qquad \text{(equation 5)}$$

The table 32 of coefficients of the second fundamental form comprises coefficients of the second fundamental form L, M, and N derived from the following equations. Assuming that ω is an angle between the fundamental vectors Su and Sv, then their inner product F, and the absolute value H of the vector product of the fundamental vectors, are represented as follows using the coefficients of the first fundamental form:

$$F = |s_u| \cdot |s_v| \cos \omega \qquad \text{(equation 6)}$$

$$\begin{aligned} H &= |s_u \times s_v| \\ &= |s_u| \cdot |s_v| \sin \omega \\ &= \sqrt{EG(1 - \cos^2 \omega)} \\ &= \sqrt{EG - F^2} \end{aligned} \qquad \text{(equation 7)}$$

Then using this calculated value H, the unit normal vector n on the curved surface is represented by:

$$n = \frac{(s_u \times s_v)}{H} \qquad \text{(equation 8)}$$

Figure 3:
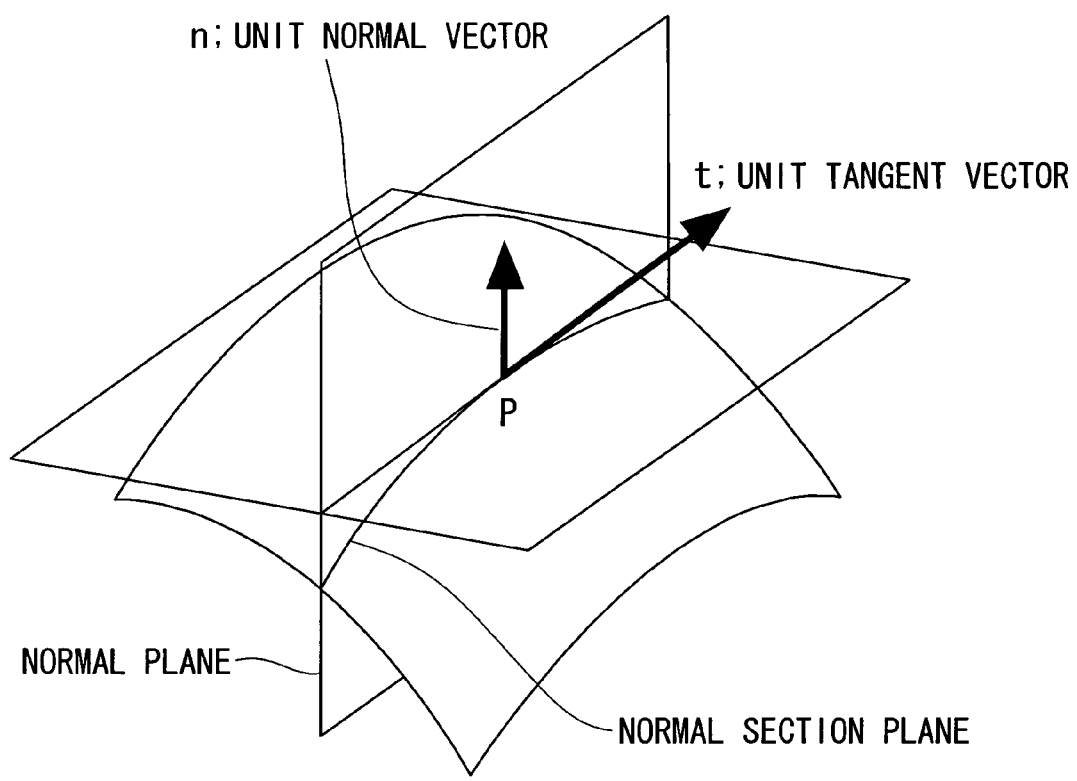
FIG. 3 is an explanatory diagram showing planes in which a unit tangent vector t and an unit normal vector n extend.

Moreover, as shown in FIG. 3, the pencil of lines of the tangent vectors at a point P on the curved surface exists in this tangent plane, and a unit tangent vector t of these is represented by the following equation:

$$t = \frac{ds}{ds} = s_u \left(\frac{du}{ds}\right) + s_v \left(\frac{dv}{ds}\right) \qquad \text{(equation 9)}$$

The plane determined by t and n as shown in FIG. 3 is called a normal plane.

The curvature κ at the point P on this normal section plane is called a normal curvature. Differentiating t for the arc length s on the normal section plane gives:

$$\frac{dt}{ds} = s_u\frac{d^2u}{ds^2} + s_v\frac{d^2v}{ds^2} + s_{uu}\left(\frac{du}{ds}\right)^2 + 2s_{uv}\left(\frac{du}{ds}\right)\left(\frac{dv}{ds}\right) + s_{vv}\left(\frac{dv}{ds}\right)^2 \quad \text{(equation 10)}$$

Multiplying both equations by the normal vector, and introducing the following coefficients of the second fundamental form:

$$L = n \cdot s_{uu}, M = n \cdot s_{uv}, N = n \cdot s_{vv} \quad \text{(equation 11)}$$

gives:

$$(n \cdot n)\kappa = L\left(\frac{du}{ds}\right)^2 + 2M\left(\frac{du}{ds}\right)\left(\frac{dv}{ds}\right) + N\left(\frac{dv}{ds}\right)^2 \quad \text{(equation 12)}$$

The coefficients of the second fundamental form L, M, and N described above are uniquely determined for the respective meshes in this way. The table 32 of coefficients of the second fundamental form stores the values for the respective points ID1 to IDmn.

If equation 5 is substituted in equation 12, the following equation is obtained.

$$\kappa = \frac{L(du)^2 + 2Mdudv + N(dv)^2}{E(du)^2 + 2Fdudv + F(dv)^2} \quad \text{(equation 13)}$$

From the above, the normal curvature is computed from the coefficients of the first fundamental form and the coefficients of the second fundamental form.

The converting program 2 is a computer program which executes a process for reading out the necessary information for a free-form surface from the point sequence information table 30, the table 31 of coefficients of the first fundamental form, and the table 32 of coefficients of the second fundamental form, and then creating free-form surface data, and transforming this into a form which another computer aided design application can interpret.

The reproducing program 3, similarly to the converting program 2, is a computer program which executes a process for reading out the necessary information for a free-form surface from the point sequence information table 30, the table 31 of coefficients of the first fundamental form, and the table 32 of coefficients of the second fundamental form, then creating free-form surface data, and outputting to the graphic display processing section 11.

The database 10 stores the above described point sequence information table 30, the table 31 of coefficients of the first fundamental form, and the table 32 of coefficients of the second fundamental form, and writes in the output result of the analysis program 1 in association with a mesh ID described later.

The graphic display processing section 11 performs graphic display processing on the output results from the reproducing program, and other computer aided design applications.

The display section 12 displays the output results of the graphic display processing section 11.

The output section 13 outputs the output results of the graphic display processing section 11 to the communication section, other recording media, or the like. The communication section transfers data such as the point sequence information, the coefficients of the first fundamental form, and the coefficients of the second fundamental form stored in the database 1 to other severs or clients via a network such as a LAN, the Internet, or the like.

Figure 4:
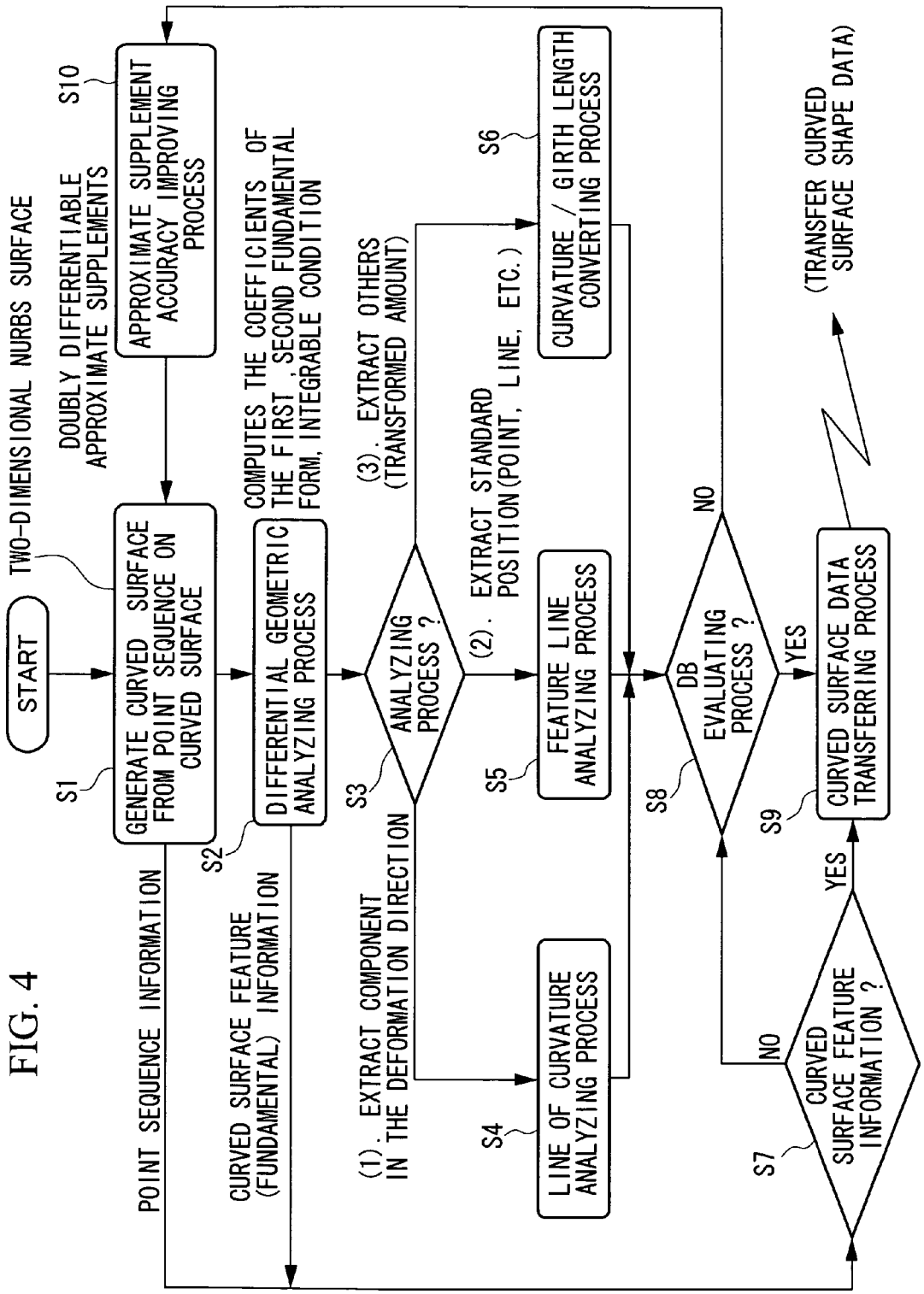
FIG. 4 is a flowchart showing a processing flow from free-form surface analysis to data transfer, by an analysis program 1.

Next is a description of a series of processing flows related to the free-form surface analysis, conversion, and reproduction by the computer aided design system of the present embodiment, with reference to the drawings. FIG. 4 is a flowchart showing a processing flow from free-form surface analysis to data transfer, by the analysis program 1.

By the user's operation, the CPU receives an analyze command for the actual measurement value data 20 or other computer aided design format data 21, reads out the analysis program 1 from ROM, and executes the free-form surface analyzing process. Firstly, the CPU performs a process for extracting a plurality of point sequences on a curved surface such as a two-dimensional NURBS surface, bicubic surface, or the like, held by the actual measurement value data 20 or the other computer aided design format data 21. Then, a curved surface is generated from this point sequence using the other computer aided design system (step S1 in FIG. 4), and the curved surface is divided into a predetermined mn mesh points as shown in FIG. 2, after which the respective mesh parts are standardized by fundamental vectors Su and Sv. The point sequence information (u, v) generated during the standardization is written in the point sequence information table 30 held by the database 10, in association with the mesh ID.

Next, the CPU executes differential geometric analysis processing. That is, it performs processing for computing the coefficients of the first fundamental form E, F, and G defined by the fundamental vectors Su and Sv which form the tangent plane of the mesh. The computed coefficients of the first fundamental form E, F and G, similarly to the point sequence information, are written in the table 31 of coefficients of the first fundamental form held by the database 10, in association with the mesh ID. Moreover, the CPU performs a process for computing the coefficients of the second fundamental form L, M, and N defined by the fundamental vectors Su and Sv and an unit normal vector n of the mesh. The computed coefficients of the second fundamental form L, M, and N, similarly to the coefficients of the first fundamental form E, F and G, are written in the table 32 of coefficients of the second fundamental form held by the database 10, in association with the mesh ID.

Moreover, the CPU performs processing for computing an integrable condition which is a condition where the differential equation representing the above described mesh is continuous at the respective boundaries of the mesh, in other words, a condition where this differential equation has a unique solution.

Now, the curved surface coordinates (u, v) described above are substituted by (u1, u2) and the point is made p (u1, u2). If a curved line formed by fixing u2 and moving u1 is called a u1 curved line, and a curved line formed by fixing u1 and moving u2 is called a u2 curved line, then assuming that p (u1, u2) on the curved surface is the initial point, then the tangent vector along the u1 curved line and the u2 curved line can be calculated as follows:

$$e_1 = \frac{\partial p}{\partial u^1}, e_2 = \frac{\partial p}{\partial u^2} \quad \text{(equation 14)}$$

Then, the unit normal vector n can be calculated from e1 and e2 as follows:

$$n = \frac{e_1 \times e_2}{\|e_1 \times e_2\|} \quad \text{(equation 15)}$$

In this way, three vectors {e1, e2, n} are defined for the respective points on the curved surface.

For the respective points, first fundamental quantities E, F and G are defined as follows:

$$E = \|e_1\|^2, F = (e_1, e_2), G = \|e_2\|^2 \quad \text{(equation 16)}$$

Then, a first fundamental tensor ($g_{ij}$, i, j=1, 2) is defined as follows:

$$g_{11} = E, g_{12} = g_{21} = F, g_{22} = G \quad \text{(equation 17)}$$

Moreover, four numerical sets $g^{ij}$, i, j=1, 2 are defined as follows.

$$g^{11} = \frac{G}{EG - F^2}, \quad \text{(equation 18)}$$

$$g^{12} = g^{21} = -\frac{F}{EG - F^2}, g^{22} = \frac{E}{EG - F^2}$$

Furthermore, for the respective points, second fundamental quantities L, M and N are defined as follows:

$$L = \left(\frac{\partial^2 p}{\partial (u^1)^2}, n\right), M = \left(\frac{\partial^2 p}{\partial u^1 \partial u^2}, n\right), N = \left(\frac{\partial^2 p}{\partial (u^2)^2}, n\right) \quad \text{(equation 19)}$$

Then, a second fundamental tensor ($h_{ij}$, i, j=1, 2) is defined as follows:

$$h_{11} = L, h_{12} = h_{21} = M, h_{22} = N \quad \text{(equation 20)}$$

Now, if the dynamic frame {e1, e2, n} is differentiated by the curved surface coordinates (u1, u2), structural equations of a curved surface shown by the following two equations (Gaussian equation of equation 21 and Weingarten's equation of equation 22) are obtained:

$$\frac{\partial e_i}{\partial u^j} = \left\{ \begin{array}{c} k \\ i \ j \end{array} \right\} e_k + h_{ij} n \quad \text{(equation 21)}$$

$$\frac{\partial n}{\partial u^i} = -g^{jk} h_{ij} e_k \quad \text{(equation 22)}$$

$$\left\{ \begin{array}{c} k \\ i \ j \end{array} \right\} = \frac{1}{2} g^{kl} \left( \frac{\partial g_{lj}}{\partial u^i} + \frac{\partial g_{li}}{\partial u^j} + \frac{\partial g_{ij}}{\partial u^l} \right) \quad \text{(equation 23)}$$

where equation 23 exhibits the Christoffel symbol.

The integrable condition of these structural equations 21 and 22 is shown by the following two equations (the Gaussian equation of equation 24 and the Mainardi-Codazzi's equation of equation 25):

$$R^i_{jkl} = g^{im}(h_{jk}h_{lm} - h_{jl}h_{km}) \quad \text{(equation 24)}$$

$$\frac{\partial h_{ij}}{\partial u^k} - \frac{\partial h_{ik}}{\partial u^j} + \left\{ \begin{array}{c} l \\ i \ j \end{array} \right\} h_{lk} - \left\{ \begin{array}{c} l \\ i \ k \end{array} \right\} h_{lj} = 0 \quad \text{(equation 25)}$$

$$R^i_{jkl} = \frac{\partial}{\partial u^l} \left\{ \begin{array}{c} l \\ j \ k \end{array} \right\} - \frac{\partial}{\partial u^k} \left\{ \begin{array}{c} i \\ j \ l \end{array} \right\} + \quad \text{(equation 26)}$$

$$\left\{ \begin{array}{c} m \\ j \ k \end{array} \right\} \left\{ \begin{array}{c} i \\ m \ l \end{array} \right\} - \left\{ \begin{array}{c} m \\ j \ l \end{array} \right\} \left\{ \begin{array}{c} i \\ m \ k \end{array} \right\}$$

where equation 26 exhibits the Riemann-Christoffel curvature tensor.

In the case where the first fundamental tensor ($g_{ij}$, i, j=1, 2) and the second fundamental tensor ($h_{ij}$, i, j=1, 2) are applied as functions of the curved surface coordinate (u1, u2) and they satisfy the Gaussian equation and the Mainardi-Codazzi's equation described above, the shape of the curved surface having such $g_{ij}$ and $h_{ij}$ is uniquely determined (refer to Bonnet's fundamental theory). Therefore, the mesh is C2 continuous.

The CPU performs these arithmetic processes and calculates the integrable condition described above (step S2).

Next, the CPU executes a line of curvature analyzing process, a feature line analyzing process, and a curvature/girth length converting process (step S3). Firstly, the principal curvatures $\kappa_1$ and $\kappa_2$ in the mesh are calculated based on the coefficients of the first fundamental form E, F and G, and the coefficients of the second fundamental form L, M and N by the line of curvature analyzing process (step S4). That is to say, firstly the extremum of the curvature $\kappa_1$ described above is calculated. The shape of the normal section plane, which is the line of intersection of the normal plane and the curved surface, changes together with the tangential direction, and accompanied by this, the normal curvature also changes. This shape returns to the initial condition when the normal plane is half rotated. Now, assuming that $$\gamma = \frac{dv}{du} \quad \text{(equation 27)}$$

and rewriting i as the function κ(γ) of γ, gives:

$$\{L - \kappa(\gamma) \cdot E\} + 2\{M - \kappa(\gamma) \cdot F\} \gamma + \{N - \kappa(\gamma) \cdot G\} \gamma^2 = 0 \quad \text{(equation 28)}$$

From this quadratic equation of γ, for dκ(γ)/dγ=0, κ(γ) becomes the extremum. Then, if equation 15 is differentiated in this condition for the extremum, and κ and γ are rewritten as ($\tilde{\kappa}$) and ($\tilde{\gamma}$), $$(M - \kappa F) + (N - \kappa G) \gamma = 0 \quad \text{(equation 29)}$$

is obtained. Then, if it is substituted in equation 16, $$(L - \kappa E) + (M - \kappa) \gamma = 0 \quad \text{(equation 30)}$$

is obtained. The following relations are obtained from these equations:

$$\tilde{\gamma} = \frac{-(M - \tilde{\kappa}F)}{(N - \tilde{\kappa}G)} = \frac{-(L - \tilde{\kappa}E)}{(M - \tilde{\kappa}F)} \quad \text{(equation 31)}$$

$$\tilde{\kappa} = \frac{(M + \tilde{\gamma}N)}{(F + \tilde{\gamma}G)} = \frac{(L + \tilde{\gamma}M)}{(E + \tilde{\gamma}F)} \quad \text{(equation 32)}$$

Figure 5:
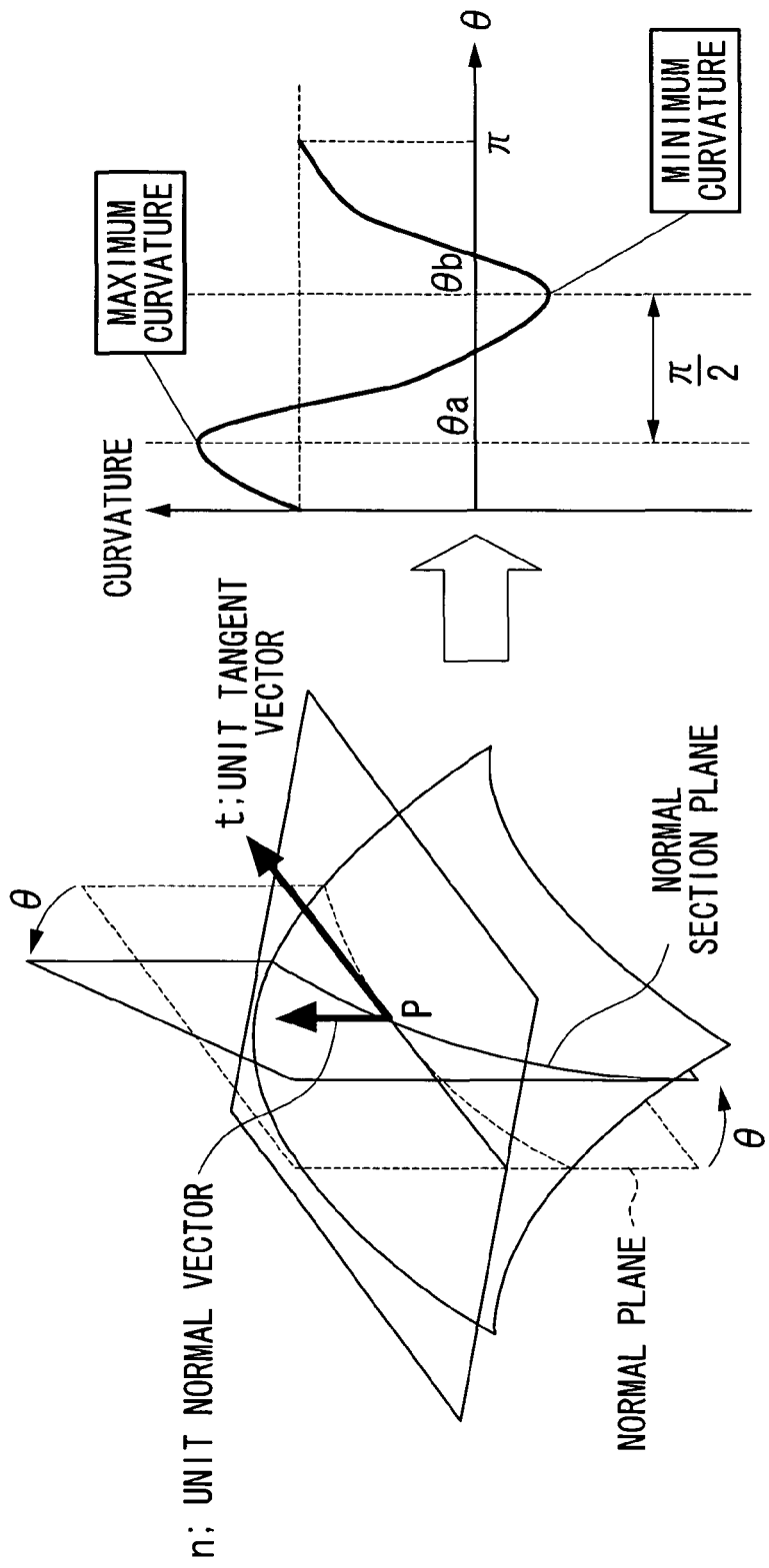
FIG. 5 is an explanatory diagram showing an aspect of curvature change.

If equation 18 is modified, $$(EG - F^2)\kappa^2 - (EN + LG - 2MF)\kappa + LN - M^2 = 0 \quad \text{(equation 33)}$$

is obtained. The coefficient of $\tilde{\kappa}^2$ is positive from equation 7. Assuming that the roots are $\kappa_1$ and $\kappa_2$, the value becomes the principal curvature as shown in FIG. 5.

Next, the Gaussian curvature or the mean curvature are calculated based on the principal curvature (step S5). That is, from the relation of the roots and the coefficients of the quadratic equation, $$K_m = \frac{1}{2}(\kappa_1 + \kappa_2) = \frac{1}{2}\frac{(EN + LG - 2MF)}{(EG - F^2)} \quad \text{(equation 34)}$$

$$K_g = \kappa_1\kappa_2 = \frac{(LN - M^2)}{(EG - F^2)} \quad \text{(equation 35)}$$

are calculated. Here, $K_m$ is the mean curvature and $K_g$ is the Gaussian curvature. When $K_g=0$, this is the case where the curved surface becomes the developable surface as shown in FIG. 6, and the line of curvature on the curved surface becomes a straight line. In the present embodiment, the point where this Gaussian curvature becomes zero is assumed to be the reference point of transformation described later.

Figure 7:
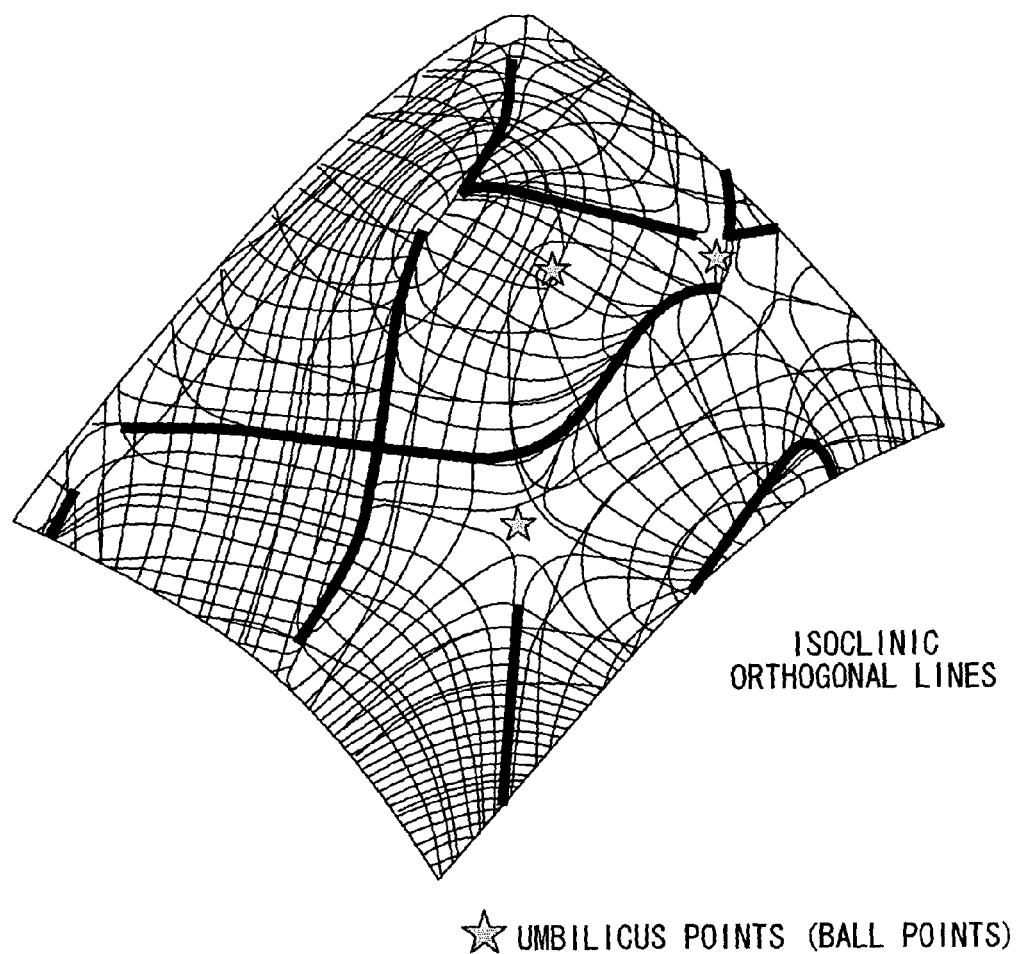
FIG. 7 is an explanatory diagram showing isoclinic orthogonal lines.
Figure 8:
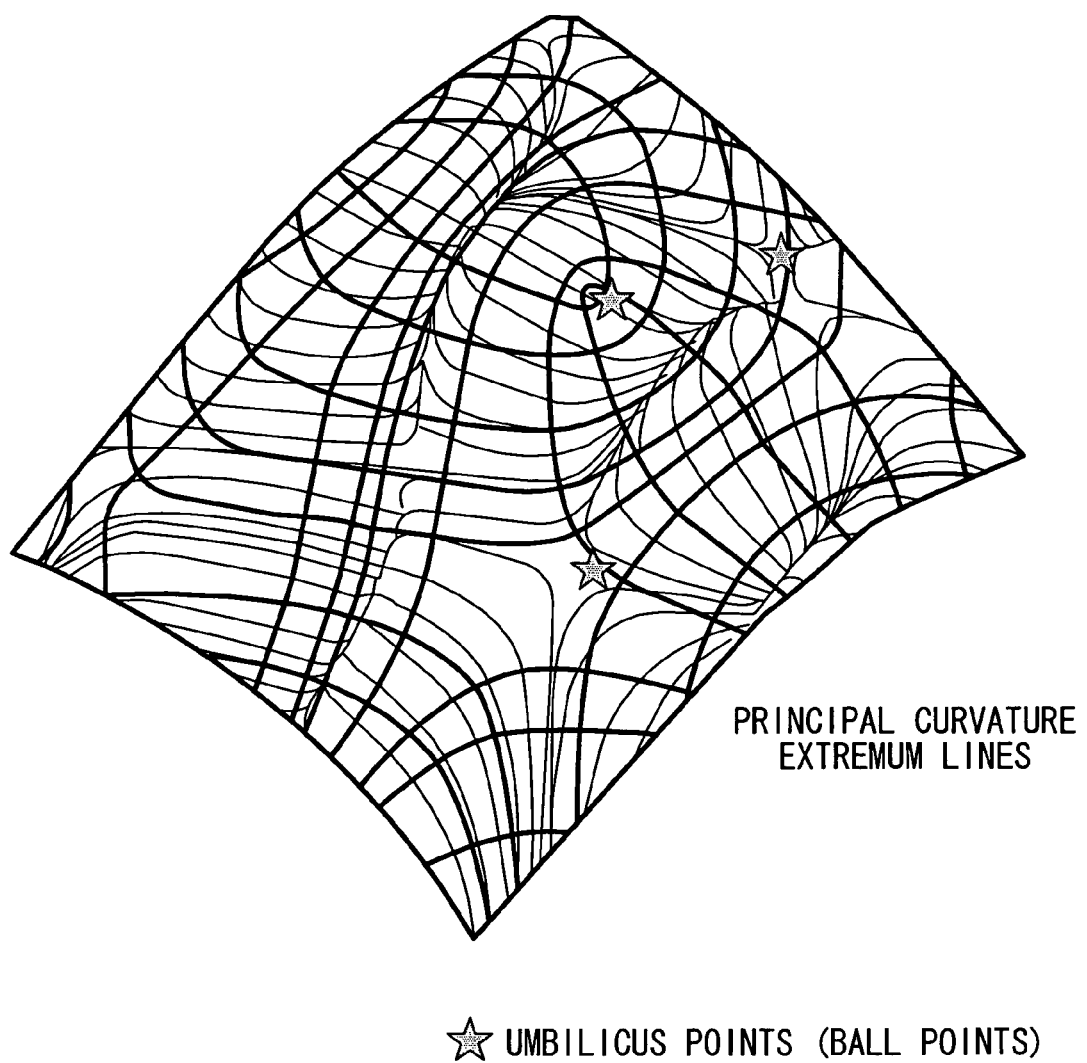
FIG. 8 is an explanatory diagram showing principal curvature extremum lines.
Figure 9:
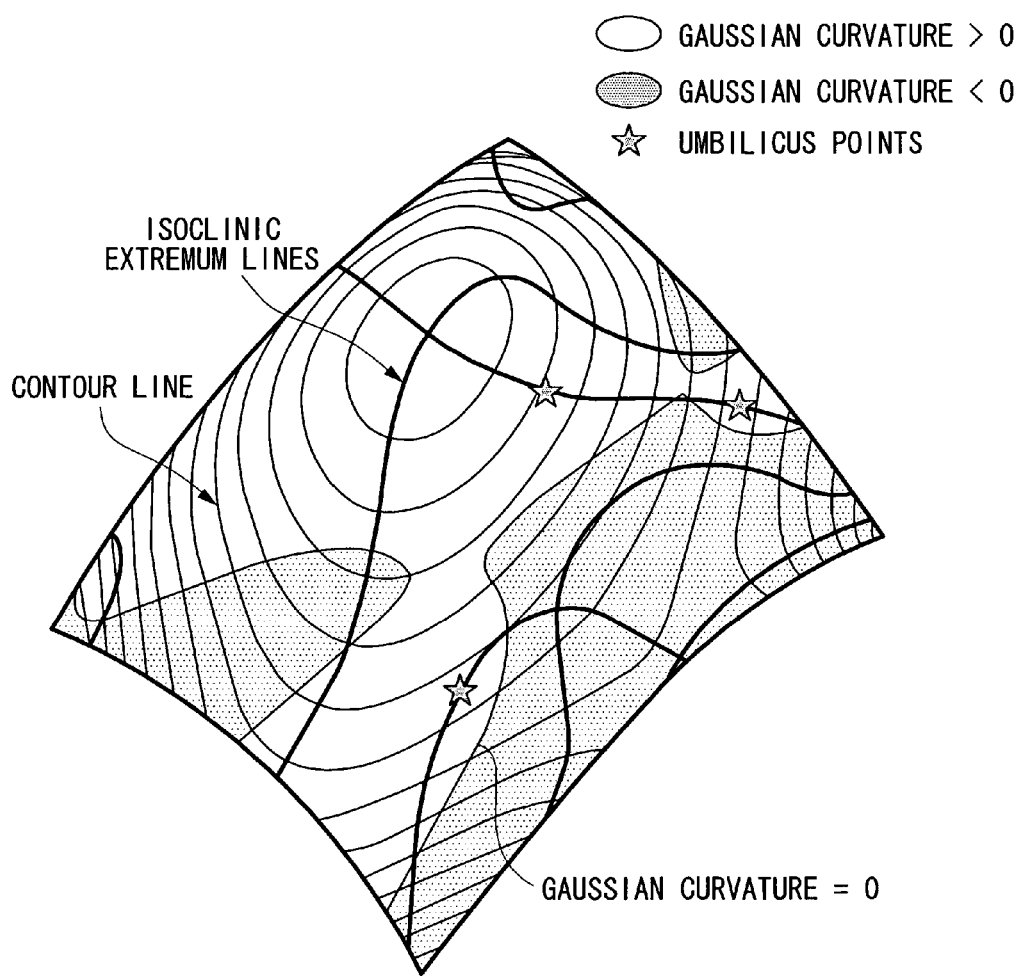
FIG. 9 is an explanatory diagram showing isoclinic extremum lines and aspects of Gaussian curvature distribution.

As an appropriate point for the reference point of transformation other than this point, for example, lines of curvature, borderlines (ridgelines), isoclinic orthogonal lines shown in FIG. 7, principal curvature extremum lines shown in FIG. 8, isoclinic extremum lines shown in FIG. 9, or umbilicus points may be selected. These are points or lines which become a reference point or a reference line of transformation defined by changing patterns of one or more feature quantities among the principal curvature, the principal direction, the Gaussian curvature, the mean curvature and the line of curvature, which are feature quantities showing the feature of the curved surface. It is possible to calculate these based on the coefficients of the first fundamental form and the coefficients of the second fundamental form.

Moreover, the line of curvature showing the principal direction of the mesh is calculated based on the principal curvature. That is, eliminating $\tilde{\kappa}$ from equation 19 gives:

$$(MG-NF)\gamma^2+(GL-NE)\gamma+FL-ME=0 \quad \text{(equation 36)}$$

or $$(MG-NF)dv^2+(GL-NE)dudv+(FL-ME)du^2=0 \quad \text{(equation 37)}$$

Both these equations are equations of the line of curvature and the quadratic equation so that $\gamma_1$ and $\gamma_2$ have the following relations:

$$\gamma_1 + \gamma_2 = \frac{-(GL-NE)}{(MG-NF)}, \gamma_1\gamma_2 = \frac{(FL-ME)}{(MG-NF)} \quad \text{(equation 38)}$$

At a point on the curved surface, the curvature becomes an extremum in the direction determined by $\gamma_1$ and $\gamma_2$. The tangent vector on the curved surface is (Sudu+Svdv) and the inner product of the two tangent vectors corresponding to $\gamma_1$ and $\gamma_2$ becomes:

$$(ds)_1 \cdot (ds)_2 = \{(s_u+s_v\gamma_1)\cdot(s_u+s_v\gamma_2)\}(du)_1(dv)_2 \quad \text{(equation 39)}$$

Figure 10:
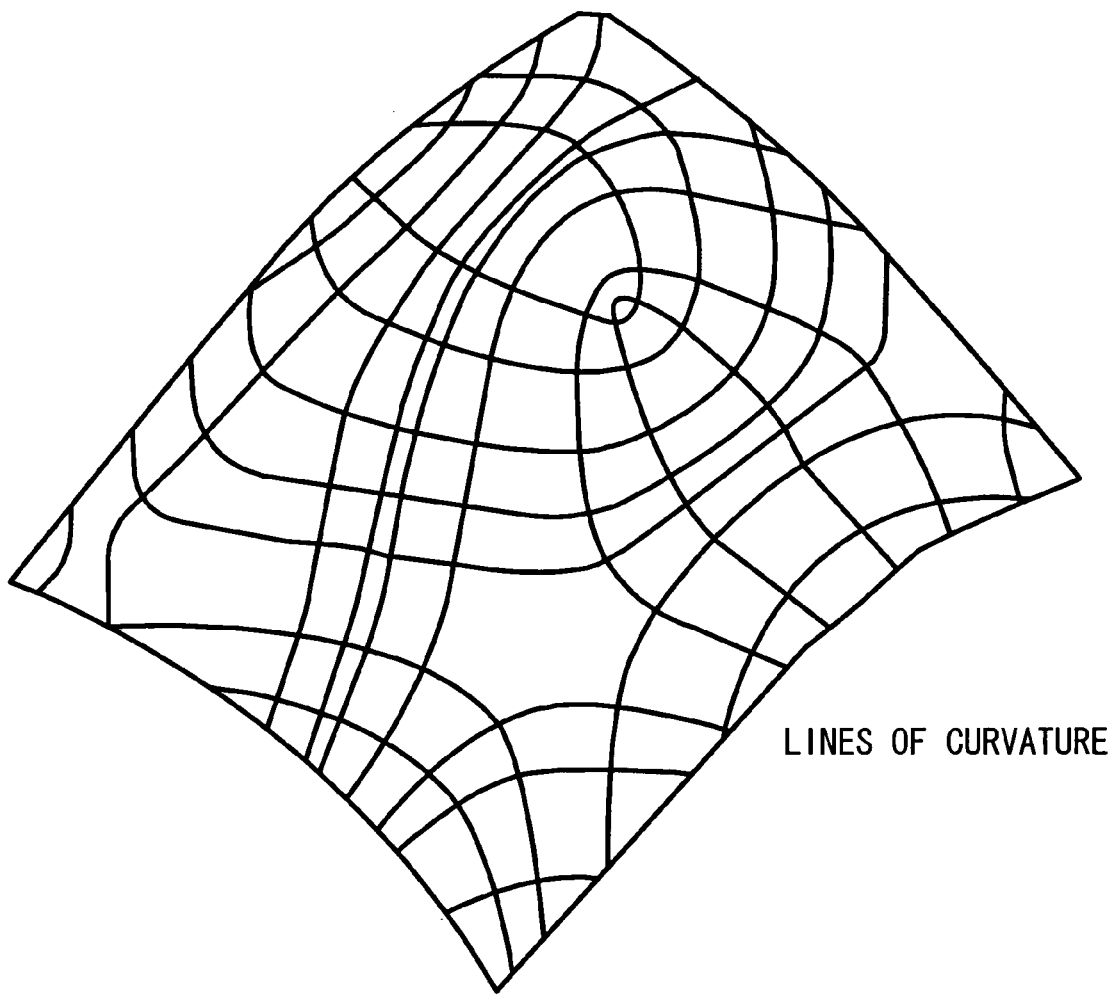
FIG. 10 is an explanatory diagram showing lines of curvature.

If inside the bracket { } is converted then:

$$\{E(MG-NF)-F(GL-NE)+G(FL-ME)\}/(MG-NF) \quad \text{(equation 40)}$$

becomes zero. That is, it is found that the two tangential directions of the normal section plane of the principal curvature become orthogonal. This direction is called the principal direction. In the case where this direction and the tangent line on the curved surface are matched, this becomes the lines of curvature shown in FIG. 10.

From the above, the calculation process of the line of curvature showing the principal direction of the mesh is performed.

Next, the curvature/girth length converting process is performed (step S6). That is, the CPU calculates the girth length based on the curvature which is calculated based on the coefficients of the first fundamental form E, F, and G and the coefficients of the second fundamental form L, M, and N. Along the line of curvature calculated by the line of curvature calculating process described above, the radius of curvature is calculated from the curvature (1/r), and the girth length of the line of curvature is expanded and contracted in each calculation interval.

From the above, the analyzing process is performed.

Next, after the point sequence information, the coefficients of the first fundamental form, and the coefficients of the second fundamental form, which were generated and extracted at step S1 and step S2, have been collected (Yes in step S7), the CPU performs the curved surface data transferring process (step S9). On the other hand, in the case where such information has not been completed, the database evaluating process is performed (No in step S7). That is, the shape reproduced based on the principal direction, the reference position (point, line, or the like), the transformed amount, that were calculated at steps S4 to S6, and the shape reproduced based on the point sequence information, the coefficients of the first fundamental form, and the coefficients of the second fundamental form are compared, and in the case where they match (Yes in step S8), the curved surface data transferring process is performed (step S9). In the case where they do not match (No in step S8), an accuracy improving process by approximation and interpolation is performed. That is, the initial curved surface is approximated and interpolated so that it becomes doubly differentiable, and the processes described above are performed again from step S1. Then, at the stage where the comparative evaluation in step S8 is matched, the flow shifts to the curved surface data transferring process.

The curved surface data is transferred to the converting program 2 or the reproducing program 3 shown in FIG. 1. If the CPU receives a convert command, it executes the converting program 2. That is, firstly assuming that a point selected as a feature point or a feature line, where the Gaussian curvature becomes zero, is the transformation reference, the line of curvature is expansion and contraction transformed by the girth length in the line of curvature direction so that the mesh or the curved surface is reproduced. Then, a plurality of point sequences on the curved surface are extracted from the reproduced mesh or curved surface, and the point sequences are converted according to a graphical representation algorithm in another computer aided design system. The converted graphics data is reproduced by the other computer aided design application 22 and then output to the graphic display processing section 11. The graphic display processing section 11 performs graphic display processing of the data output from the computer aided design application 22 and outputs this to the display section 12. The display section 12 receives the input of the display data and displays this.

Moreover, if the CPU receives a reproduction command, it executes the reproducing program 3. The reproducing program makes the CPU execute the processes in the converting program except for the converting process. That is, assuming that a point where the Gaussian curvature becomes zero is the transformation reference, the line of curvature is expansion and contraction transformed by the girth length in the line of curvature direction so that the mesh or the curved surface is reproduced. Then, the reproduced graphics data is output to the graphic display processing section 11, and after display processing, it is displayed in the display section 12.

As described above, according to the computer aided design system of the present embodiment, an effect can be obtained where a free-form surface can be analyzed, converted and reproduced while retaining C2 continuity. Therefore, an effect can be obtained where the utility of a computer aided design model can be greatly increased, and the efficiency of the design and production processes can be improved.

In the computer aided design system of the present embodiment, the description is for a series of processes related to free-form surface analysis, conversion, and reproduction in a computer aided design model. However, the computer aided design system of the present invention is not limited to this, and is applicable to a computer graphics system, or a system and a program which performs graphical representation using a computer.

Moreover, in the computer aided design system of the present embodiment, as shown in FIG. 2, as a suitable example, a curved surface is divided into mesh points, and then standardized by the fundamental vectors Su and Sv, so that the free-form surface analysis, conversion, and reproduction are performed by a u, v parameter form which uses point sequence information (u, v). However, the computer aided design system of the present invention is not limited to this, and coordinate values for (x, y, z) coordinate parameters may be used.

The computer aided design system described above contains a computer system inside. Moreover steps of a series of processes related to the aforementioned free-form surface analysis, conversion, and reproduction are stored in a computer readable recording media in program format. A computer reads out and executes this program, to thereby perform the above processes. Here, the computer readable recording media is for example a magnetic disk, magneto-optical disk, CD-ROM, DVD-ROM, semiconductor memory, or the like. Moreover, the arrangement may be such that this computer program is delivered to a computer by a communication line, and the computer which receives this delivery, executes the program.

The invention claimed is:

1. A computer aided design system comprising:
a point sequence information extraction device which extracts a plurality of point sequences on a curved surface;
a dividing device which generates a curved surface from the point sequences using another computer aided design system, and divides the curved surface into a mesh having a predetermined number of mesh points;
a first fundamental form computing device for computing coefficients of a first fundamental form at a mesh point of the mesh, the coefficients of the first fundamental form being defined at the mesh point by first-order differential values of the mesh point;
a second fundamental form computing device for computing coefficients of a second fundamental form at the mesh point, the coefficients of the second fundamental form being defined at the mesh point by a product of second-order differential values of the mesh point and a normal vector of the mesh at the mesh point;
a memory device which stores the point sequence information, the coefficients of the first fundamental form and the coefficients of the second fundamental form;
a principal curvature computing device which computes a principal curvature of the mesh point based on the coefficients of the first fundamental form and the coefficients of the second fundamental form;
a line of curvature computing device which computes a line of curvature showing a principal direction of the mesh based on the principal curvature;
a feature point/feature line analyzing device which extracts a point or a line which becomes a reference point or a reference line, respectively, of a transformation defined by changing patterns of one or more feature quantities among five feature quantities showing features of the curved surface, the five feature quantities comprising a Gaussian curvature and a mean curvature computed based on the principal curvature, the principal direction, the line of curvature, and the coefficients of the first fundamental form and the coefficients of the second fundamental form; and
a girth length computing device which computes a girth length based on a curvature computed from the coefficients of the first fundamental form and the coefficients of the second fundamental form.

2. The computer aided design system according to claim 1, further comprising:
a reproducing device which transforms the line of curvature for the girth length in the line of curvature direction, with the point or the line as the transformation reference point or reference line, respectively, and reproduces a shape of the mesh or the curved surface.

3. The computer aided design system according to claim 2, further comprising:
a converting device which extracts a plurality of point sequences on a curved surface from the reproduced shape of the mesh or the curved surface, and converts the point sequences according to a graphical representation algorithm in another computer aided design system.

4. The computer aided design system according to claim 1, wherein the principal curvature computing device computes the principal curvature of the mesh point by solving a quadratic equation that includes the coefficients of the first fundamental form and the coefficients of the second fundamental form.

5. A computer aided design program stored in a non-transitory computer-readable recording medium for causing a computer to execute:
a point sequence information extraction process for extracting a plurality of point sequences on a curved surface;
a dividing process for generating a curved surface from the point sequences using another computer aided design program, and dividing the curved surface into a mesh having a predetermined number of mesh points;
a first fundamental form computing process for computing coefficients of a first fundamental form at a mesh point of the mesh, the coefficients of the first fundamental form being defined at the mesh point by first-order differential values of the mesh point;
a second fundamental form computing process for computing coefficients of a second fundamental form at the mesh point, the coefficients of the second fundamental form being defined at the mesh point by a product of second-order differential values of the mesh point and a normal vector of the mesh at the mesh point;
a storage process for storing the point sequence information, the coefficients of the first fundamental form and the coefficients of the second fundamental form;

a principal curvature computing process for computing a principal curvature of the mesh based on the coefficients of the first fundamental form and the coefficients of the second fundamental form;

a line of curvature computing process for computing a line of curvature showing a principal direction of the mesh based on the principal curvature;

a feature point/feature line analyzing process for extracting a point or a line which becomes a reference point or a reference line, respectively, of a transformation defined by changing patterns of one or more feature quantities among five feature quantities showing features of the curved surface, the five feature quantities comprising a Gaussian curvature and a mean curvature computed based on the principal curvature, the principal direction, the line of curvature, and the coefficients of the first fundamental form and coefficients of the second fundamental form; and a girth length computing process for computing a girth length based on a curvature computed from the coefficients of the first fundamental form and the coefficients of the second fundamental form.

6. The computer aided design program according to claim 5, for further causing a computer to execute a reproducing process for transforming the line of curvature for the girth length in the line of curvature direction, with the point or the line as the transformation reference point or reference line, respectively, and reproducing a shape of the mesh or the curved surface.

7. The computer aided design program according to claim 6, for further causing a computer to execute a converting process for extracting a plurality of point sequences on a curved surface from the reproduced shape of the mesh or the curved surface, and converting the point sequences according to a graphical representation algorithm in another computer aided design system.

8. A computer aided design system comprising:

a point sequence information extraction device which extracts a plurality of point sequences on a curved surface;

a dividing device which generates a curved surface from the point sequences using another computer aided design system, and divides the curved surface into a mesh having a predetermined number of mesh points;

a first fundamental form computing device for computing coefficients of a first fundamental form at a mesh point of the mesh, the coefficients of the first fundamental form being defined at the mesh point by first-order differential values of the mesh point;

a second fundamental form computing device for computing coefficients of a second fundamental form at the mesh point, the coefficients of the second fundamental form being defined at the mesh point by a product of second-order differential values of the mesh point and a normal vector of the mesh at the mesh point; and a memory device which stores the point sequence information, the coefficients of the first fundamental form and the coefficients of the second fundamental form, wherein, in a case where a mesh point of the mesh is represented by $S(u, v)$, the coefficients of the first fundamental form at the mesh point represented by $S(u, v)$ are E, F and G, such that the coefficients E, F and G are represented by the followings equations:

$E=Su^2;$ $F=Su\times Sv;$ and $G=Sv^2,$ and wherein $Su=\partial s/\partial u$ and $Sv=\partial s/\partial v$.

9. The computer aided design system according to claim 8, wherein the coefficients of the second fundamental form at a mesh point of the mesh are represented by L, M and N, such that L, M and N are represented by the following equations:

$L=n\times Suu;$ $M=n\times Suv;$ and $N=n\times Svv,$ wherein n denotes a normal vector of the mesh at the mesh point where the coefficients of the second fundamental form are represented by L, M and N, and wherein $Suu=(\partial^2 s/\partial u^2)$, $Suv=(\partial s/\partial v)\times(\partial s/\partial u)$, and $Svv=(\partial^2 s/\partial v^2)$.

10. A computer aided design program stored in a computer-readable recording medium for causing a computer to execute:

a point sequence information extraction process for extracting a plurality of point sequences on a curved surface;

a dividing process for generating a curved surface from the point sequences using another computer aided design program, and dividing the curved surface into a mesh having a predetermined number of mesh points;

a first fundamental form computing process for computing coefficients of a first fundamental form at a mesh point of the mesh, the coefficients of the first fundamental form being defined at the mesh point by first-order differential values of the mesh point;

a second fundamental form computing process for computing coefficients of a second fundamental form at the mesh point, the coefficients of the second fundamental form being defined at the mesh point by a product of second-order differential values of the mesh point and a normal vector of the mesh at the mesh point; and a storage process for storing the point sequence information, the coefficients of the first fundamental form and the coefficients of the second fundamental form, wherein, in a case where a mesh point of the mesh is represented by $S(u, v)$, the coefficients of the first fundamental form at the mesh point represented by $S(u, v)$ are E, F and G, such that the coefficients E, F and G are represented by the followings equations:

$E=Su^2;$ $F=Su\times Sv;$ and $G=Sv^2,$ and wherein $Su=\partial s/\partial u$ and $Sv=\partial s/\partial v$.

11. The computer aided design program according to claim 10, wherein the coefficients of the second fundamental form at a mesh point of the mesh are represented by L, M and N, such that L, M and N are represented by the following equations:

$$L = n \times Suu;$$

$$M = n \times Suv; \text{ and}$$

$$N = n \times Svv,$$

wherein n denotes a normal vector of the mesh at the mesh point where the coefficients of the second fundamental form are represented by L, M and N, and wherein $Suu = (\partial^2 s/\partial u^2)$, $Suv = (\partial s/\partial v) \times (\partial s/\partial u)$, and $Svv = (\partial^2 s/\partial v^2)$.

12. A computer graphics system comprising:
a point sequence information extraction device which extracts a plurality of point sequences on a curved surface;
a dividing device which generates a curved surface from the point sequences using another computer graphics system, and divides the curved surface into a mesh having a predetermined number of mesh points;
a first fundamental form computing device for computing coefficients of a first fundamental form at a mesh point of the mesh, the coefficients of the first fundamental form being defined at the mesh point by first-order differential values of the mesh point;
a second fundamental form computing device for computing coefficients of a second fundamental form at the mesh point, the coefficients of the second fundamental form being defined at the mesh point by a product of second-order differential values of the mesh point and a normal vector of the mesh at the mesh point; and
a memory device which stores the point sequence information, the coefficients of the first fundamental form and the coefficients of the second fundamental form,
wherein, in a case where a mesh point of the mesh is represented by S(u, v), the coefficients of the first fundamental form at the mesh point represented by S(u, v) are E, F and G, such that the coefficients E, F and G are represented by the followings equations:

$$E = Su^2;$$

$$F = Su \times Sv; \text{ and}$$

$$G = Sv^2, \text{ and}$$

wherein $Su = \partial s/\partial u$ and $Sv = \partial s/\partial v$.

13. The computer graphics system according to claim 12, wherein the coefficients of the second fundamental form at a mesh point of the mesh are represented by L, M and N, such that L, M and N are represented by the following equations:

$$L = n \times Suu;$$

$$M = n \times Suv; \text{ and}$$

$$N = n \times Svv,$$

wherein n denotes a normal vector of the mesh at the mesh point where the coefficients of the second fundamental form are represented by L, M and N, and wherein $Suu = (\partial^2 s/\partial u^2)$, $Suv = (\partial s/\partial v) \times (\partial s/\partial u)$, and $Svv = (\partial^2 s/\partial v^2)$.

14. A computer graphics program stored on a non-transitory computer-readable recording medium for causing a computer to execute:
a point sequence information extraction process for extracting a plurality of point sequences on a curved surface;
a dividing process for generating a curved surface from the point sequences using another computer graphics program, and dividing the curved surface into a mesh having a predetermined number of mesh points;
a first fundamental form computing process for computing coefficients of a first fundamental form at a mesh point of the mesh, the coefficients of the first fundamental form being defined at the mesh point by first-order differential values of the mesh point;
a second fundamental form computing process for computing coefficients of a second fundamental form at the mesh point, the coefficients of the second fundamental form being defined at the mesh point by a product of second-order differential values of the mesh point and a normal vector of the mesh at the mesh point; and
a storage process for storing the point sequence information, the coefficients of the first fundamental form and the coefficients of the second fundamental form,
wherein, in a case where a mesh point of the mesh is represented by S(u, v), the coefficients of the first fundamental form at the mesh point represented by S(u, v) are E, F and G, such that the coefficients E, F and G are represented by the followings equations:

$$E = Su^2;$$

$$F = Su \times Sv; \text{ and}$$

$$G = Sv^2, \text{ and}$$

wherein $Su = \partial s/\partial u$ and $Sv = \partial s/\partial v$.

15. The computer graphics program according to claim 14, wherein the coefficients of the second fundamental form at a mesh point of the mesh are represented by L, M and N, such that L, M and N are represented by the following equations:

$$L = n \times Suu;$$

$$M = n \times Suv; \text{ and}$$

$$N = n \times Svv,$$

wherein n denotes a normal vector of the mesh at the mesh point where the coefficients of the second fundamental form are represented by L, M and N, and wherein $Suu = (\partial^2 s/\partial u^2)$, $Suv = (\partial s/\partial v) \times (\partial s/\partial u)$, and $Svv = (\partial^2 s/\partial v^2)$.

* * * * *